(12) United States Patent
Cordisco et al.

(10) Patent No.: US 12,173,663 B2
(45) Date of Patent: Dec. 24, 2024

(54) METHOD AND DEVICE FOR THE USE OF BIODIESEL IN INTERNAL COMBUSTION ENGINES WITH DIESEL CYCLE

(71) Applicant: REFUEL SOLUTIONS S.R.L., Modena (IT)

(72) Inventors: Adriano Cordisco, Modena (IT); Tommaso D'Angelo, Modena (IT); Federico De Pietri, Modena (IT); Marco Di Mola, Modena (IT); Gabriele Rebecchi, Modena (IT)

(73) Assignee: REFUEL SOLUTIONS S.R.L., Modena (IT)

( * ) Notice: Subject to any disclaimer, the term of this patent is extended or adjusted under 35 U.S.C. 154(b) by 0 days.

(21) Appl. No.: 18/255,620

(22) PCT Filed: Nov. 19, 2021

(86) PCT No.: PCT/IT2021/050375
§ 371 (c)(1),
(2) Date: Jun. 2, 2023

(87) PCT Pub. No.: WO2022/118352
PCT Pub. Date: Jun. 9, 2022

(65) Prior Publication Data
US 2024/0003306 A1    Jan. 4, 2024

(30) Foreign Application Priority Data
Dec. 3, 2020  (IT) .................. 102020000029540

(51) Int. Cl.
*F02D 19/08*    (2006.01)
*F01N 3/025*    (2006.01)
(Continued)

(52) U.S. Cl.
CPC .......... *F02D 19/081* (2013.01); *F01N 3/025* (2013.01); *F01N 3/36* (2013.01); *F01N 11/002* (2013.01);
(Continued)

(58) Field of Classification Search
CPC .............. F02D 19/0634; F02D 41/029; F02D 19/0673; B67D 7/04
See application file for complete search history.

(56) References Cited

U.S. PATENT DOCUMENTS

| | | | |
|---|---|---|---|
| 9,133,782 B1* | 9/2015 | Convisser | F02D 41/045 |
| 2015/0053304 A1* | 2/2015 | Huwyler | G06Q 40/04 |
| | | | 705/37 |
| 2017/0037789 A1* | 2/2017 | Huwyler | F02D 19/0634 |

FOREIGN PATENT DOCUMENTS

| | | |
|---|---|---|
| DE | 101 54 455 A1 | 5/2003 |
| JP | 2011169161 A | 9/2011 |

(Continued)

OTHER PUBLICATIONS

International Search Report and Written Opinion, European Patent Office, Application No. PCT/IT2021/050375, Feb. 4, 2022.

*Primary Examiner* — Anthony Ayala Delgado
(74) *Attorney, Agent, or Firm* — Gottlieb, Rackman & Reisman, PC

(57) ABSTRACT

A method for using biodiesel fuel in compression ignition internal combustion engines is described, the biodiesel fuel being present in a light oil diesel-biodiesel blend with a percentage of biodiesel greater than 7%, in which this percentage of biodiesel higher than 7% causes an increase in the viscosity of the mixture, the increase in viscosity negatively affecting the cold start of the engine; the method reduces the biodiesel concentration to below 7% in the starting phase of the engine, the reduction in concentration (Continued)

being achieved by adding light oil diesel to the light oil diesel-biodiesel blend.

15 Claims, 1 Drawing Sheet

(51) Int. Cl.
*F01N 3/36* (2006.01)
*F01N 11/00* (2006.01)
*F02D 19/06* (2006.01)
*F02D 41/06* (2006.01)

(52) U.S. Cl.
CPC ........ *F01N 11/007* (2013.01); *F02D 19/0652* (2013.01); *F02D 19/0665* (2013.01); *F02D 19/0668* (2013.01); *F02D 19/0673* (2013.01); *F02D 41/064* (2013.01); *F01N 2550/04* (2013.01); *F02D 2200/0606* (2013.01); *F02D 2200/0611* (2013.01)

(56) References Cited

FOREIGN PATENT DOCUMENTS

| | | |
|---|---|---|
| JP | 2014092053 A | 5/2014 |
| RU | 2 538 470 C1 | 1/2015 |
| WO | 2012/103368 | 8/2012 |
| WO | 2014/200424 | 12/2014 |

\* cited by examiner

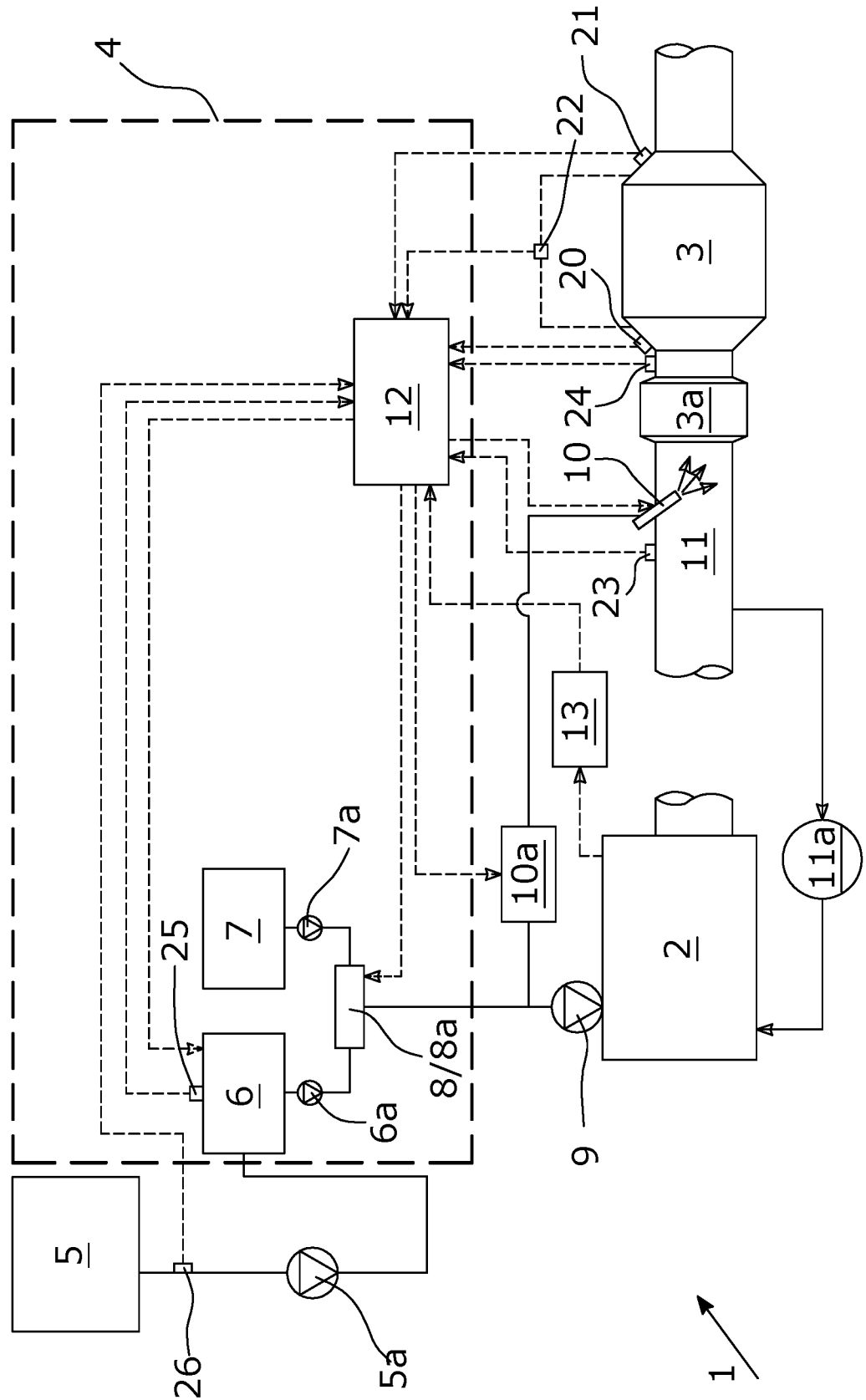

METHOD AND DEVICE FOR THE USE OF BIODIESEL IN INTERNAL COMBUSTION ENGINES WITH DIESEL CYCLE

TECHNICAL FIELD OF THE INVENTION

The present invention refers to a method and to a device for implementing this method for the use of biodiesel fuel in compression ignition internal combustion engines.

STATE OF THE ART

Biodiesel is used in a blend with light oil diesel to power diesel engines. Despite the considerable advantages that would derive from the use of biodiesel, as it is derived from biomass, the use of the biodiesel as it is causes significant drawbacks.

First, biodiesel is subject to biodegradation far more than light oil diesel.

Compared to light oil diesel, biodiesel records different data, obviously depending on the raw material of the same, with reference to the cloud point and the pour point, which respectively are −1° C. (−17° C. for light oil diesel) and −6° C. (−26° C. for light oil diesel).

Furthermore, the chemical-physical analysis of the properties of biodiesel outlines a more advantageous molecular configuration in terms of biodegradability. In fact, the linear carbon chain with oxygen atoms at the end, characterizing biodiesel, is more easily attacked by bacteria (biodegradability rate of 95% at 28 days), compared to light oil diesel which, being poor in oxygen, is hardly decomposable. It must in fact be considered that to attack fatty acids and their derivatives such as esters, microorganisms have the necessary enzymes (such as Acetyl-coA dehydrogenase) while, despite the considerable possibilities of adaptation to the various substrates of bacteria, the immediate ability to degrade diesel from light oil is not so simple or in any case immediate. These properties now indicated lead to lower stability, therefore criticality in product storage and in the use of biodiesel/light oil diesel blends.

The chemical-physical properties of biodiesel mean that the use of such biodiesel in high percentages above 10%, in cold or particularly rigid climates, or in winter seasons, can lead to complications in the use of the same.

The degradation of biodiesel affects both the biodiesel contained m the tank and the percentages remaining in the fuel circuit after the engine has been switched off. This permanence generates adhesion phenomena on the nozzles and pistons of the high pressure (HP) pump.

An anti-particulate filter (FAP) is normally installed in diesel engines for motor vehicles, i.e. an exhaust gas post-treatment device that has the function of reducing particulate emissions by retaining fine particles that are carcinogenic pollutants. Being a filter, it is necessary to periodically clean it (so-called regeneration). This regeneration, which takes place automatically, is usually carried out by raising the temperature of the filter in such a way as to transform the particulate into CO2 and H2O, which are expelled together with the other exhaust gases. If the regeneration does not take place, the clogged filter would cause the engine to malfunction, until it stops.

Particulate matter burns between 550° C. and 650° C., temperatures that are difficult to reach in the FAP, especially if it is far from the engine. For this reason, the regeneration of the particulate filter takes place by injecting fuel into the combustion chamber of the engine during the exhaust phase (a phenomenon that does not occur during normal engine operation). By evaporating the fuel it reaches, together with the burnt gases, the oxidizing catalyst in which it burns, thus raising the temperature inside the FAP in such a way as to burn the particulate and expel it from the FAP itself, regenerating it.

In the case of using biodiesel, the chemical-physical properties of the latter result in a higher evaporation temperature than light oil diesel. For this reason, in the conditions that occur during the injection of fuel into the combustion chamber during the unloading phase, the biodiesel is unable to evaporate. The use of high percentages of biodiesel in light oil diesel configure the problems of the so-called blow-by that is, the non-evaporated fuel passes through the piston seals and dilutes the engine lubricating oil. The engine oil thus diluted has a lower lubricating power, inevitably leading to wear of the relative sliding parts.

U.S. Pat. No. 8,011,177 B2 discloses a device for the regeneration of the FAP which provides for the injection of fuel into the exhaust duct. In this case the blow-by problem does not occur.

In case of injection into the exhaust duct, the blow-by problem does not occur, however the high evaporation temperature (and related viscosity) is an obstacle to the ignition of the injected fuel as the temperature in the exhaust duct is lower than in the combustion chamber.

For these reasons, the use of biodiesel, mixed with light oil diesel, is used in percentages ranging from 7 to 10%, since they are identified as percentages for which the filter is able to regenerate according to the ordinary diesel cycle, without excessive blow-by.

JP-A-2011169161 discloses a filter regeneration device of a diesel engine.

JP-A-2014092053 discloses an exhaust emission control system in a construction machine.

U.S. Pat. No. 9,133,782 B1 discloses a system controlling a multi-fuel compression ignition engine.

WO-A1-2012103368 discloses a system and method to enable electronically controlled internal combustion engines to self-adjust parameters and operate properly on different fuels.

US-A1-2015053304 discloses a fuel system controller optimizing utilization of different fuels in various single and multi-fueled engines.

OBJECT AND SUMMARY OF THE INVENTION

Object of the invention is solving the problems related to the use of high percentages of biodiesel in diesel cycle engines, such as: regeneration of the FAP, if present, freezing and deterioration of biodiesel, including that present in the supply ducts and, therefore, difficulties in starting the engine. Critical issues which represent the current reason why percentages greater than 7 a 10% of biodiesel blended in light oil diesel cannot be used.

The above and other objects, as will be explained below, are achieved with a method and a device as claimed in the respective independent claims.

The method for using biodiesel fuel in compression ignition internal combustion engines, such biodiesel fuel being present in a diesel-light oil-biodiesel blend with a percentage of biodiesel greater than 7%, in which the percentage of biodiesel greater than 7% causes an increase in the viscosity and evaporation temperature of this mixture, such increase in viscosity and evaporation temperature negatively affecting the cold start of the engine, reduces the biodiesel concentration below 7% in the starting phase of the engine, the concentration reduction being obtained by adding light oil diesel to the light oil diesel-biodiesel blend.

The method according to the invention further provides for the reduction of the biodiesel concentration to below 7% also in the engine shutdown phase, so as to avoid that the diesel oil biodiesel mixture with concentration of biodiesel higher than 7%, in order to avoid that in the feeding ducts of the engine the diesel-biodiesel mixture with a biodiesel concentration higher than 7% remains.

The device for the use of diesel-oil-biodiesel blends, with biodiesel percentages higher than 7%, in compression ignition internal combustion engines, of the type comprising an ECU (Engine Control Unit) able to control the operation of the engine, includes:
  an auxiliary tank for the containment of light oil diesel;
  a mixing valve adapted to mix the diesel oil-biodiesel mixture with the light oil diesel coming from the auxiliary tank;
  a Refuel Controller;
in which the Refuel Controller is connected with the ECU and the mixing valve, the Refuel Controller receiving information on the operation of the engine from the ECU and sending signals for the control of the mixing valve, so as to regulate the percentage of biodiesel in the diesel mixture to be light oil-biodiesel.

Preferred embodiments and non-trivial variants of the present invention form the subject matter of the dependent claims.

The advantage deriving from the use of the invention consists in increasing the percentage of renewable fuel.

It will be immediately obvious that innumerable variations and modifications (for example relating to shape, dimensions, arrangements and parts with equivalent functionality) can be made to what is described without departing from the scope of the invention, as appears from the attached claims.

It is understood that all attached claims form an integral part of the present description.

BRIEF DESCRIPTION OF THE DRAWINGS

The present invention will be better described by a preferred embodiment thereof, provided as a non-limiting example, with reference to the attached drawings, in which:
FIG. 1 shows the operating diagram of the device according to the invention.

DESCRIPTION OF PREFERRED EMBODIMENTS OF THE INVENTION

With reference to FIG. 1, reference number 1 designates a system comprising a diesel engine 2, equipped with an anti-particulate filter (FAP) 3, its related oxidizing catalyst 3a and a device 4 for the use of biodiesel in the diesel engine 2.

In the example of the invention shown in FIG. 1, the FAP 3 is present, but the device 4 for the use of biodiesel is applicable even if the FAP is not present.

The engine 2 is powered by a mixture, contained in a main tank 5, made up of light oil diesel and biodiesel, with a percentage of biodiesel that can reach 100%.

The mixture is sent to a small and heated tank 6 by means of a first low pressure pump 5a.

Light oil diesel is contained in an auxiliary tank 7. A second and third low pressure pump 6a and 7a pump, respectively, the mixture of light oil diesel-biodiesel from the heated tank 6, and the light oil diesel from the auxiliary tank 7, towards a mixing valve 8, thus preparing the mixture that will feed the diesel engine 2, through a high pressure pump 9, and an injector applied to an exhaust duct 11 that connects the engine 2 with the FAP 3. A metering unit is placed on the pipe that carries the mixture to the injector 10, while between the exhaust pipe 11 and the intake manifold (not shown) of the engine 2 there is, if present, an EGR (Exhaust Gas Recirculation) valve 11a, according to the known art.

The device 4 for the use of biodiesel in the engine 2 includes:
  the heated tank 6 for the light oil-biodiesel diesel mixture and its related second low pressure pump 6a;
  the auxiliary tank 7 for light oil diesel and its related third low pressure pump 7a;
  the mixing valve 8;
  a Refuel Controller 12.

The Refuel Controller 12 is connected with a plurality of sensors 20, 21, 22, 23, 24, 25, 26 and an ECU (Engine Control Unit) 13. The sensors 20, 21, 22, 23, 24, 25, 26 and the ECU 13 are able to detect the operating parameters of the engine system 2—FAP 3.

The plurality of sensors 20, 21, 22, 23, 24, 25, 26 comprises:
  a first temperature sensor 20 designed to detect the temperature of the exhaust gases at the inlet of the FAP 3;
  a second temperature sensor 21 designed to detect the temperature of the exhaust gases at the outlet of the FAP 3;
  a differential pressure sensor 22 able to detect the difference in pressure between the inlet and outlet of the FAP 3;
  a first lambda probe 23 designed to detect the percentage of oxygen m the exhaust gases, positioned in the exhaust duct 11, upstream of the additional injector 10;
  a second lambda probe 24, suitable for detecting the percentage of oxygen in the exhaust gases, positioned in the exhaust duct 11, downstream of the oxidizing catalyst 3a;
  a third temperature sensor 25 adapted to detect the temperature in the heated tank 6;
  a fourth temperature sensor 26 capable of detecting the temperature at the outlet from the main tank 5.

Obviously, if the FAP 3 were not present, all associated components would also be missing, i.e. the oxidizing catalyst 3a, the injector 10 and the supply line in which the dosing unit 10a is present, and the sensors 20, 21, 22, 23 and 24.

The operation of the system 1 is described below.

The technical problem faced and solved by the present invention consists in that a percentage of biodiesel in the diesel oil-biodiesel mixture higher than 7-10% is a source of various drawbacks. The invention makes it possible to obtain regular operation of the engine 2 and of the FAP 3 even with a diesel-oil-biodiesel blend (with a percentage of biodiesel between 10% and 100%) contained in the main tank 5. This occurs with the addition of light oil diesel, contained in the auxiliary tank 7, in the stages of:
  starting the engine 2, in cold climates, as it is favored by the lower viscosity of light oil diesel, which is less affected by the temperature than that of biodiesel;
  regeneration of the FAP 3, as it is also favored by the greater volatility of light oil diesel;
  turning off the engine 2, so as not to leave an excessive amount of biodiesel in the engine fueling circuit 2.

The addition of light oil diesel in the mixture must be such as to limit the percentage of biodiesel to 7-10% (preferably to 7%), in the two steps of starting and stopping the engine 2 and regenerating the FAP 3, so as to remove the complained inconveniences.

According to a preferred embodiment, the mixing valve 8 is replaced by a diverter valve 8a. In this way, only light oil diesel is sent to the engine 2 and to the injector 10, completely excluding biodiesel in the start-up and shutdown steps of the engine 2.

If the vehicle is to operate in particularly harsh environmental conditions from the point of view of temperatures, the diesel oil-biodiesel mixture is heated before its use, since the viscosity of the mixture increases as the temperature decreases, even solidifying. The heating, detected by the first temperature sensor 25, takes place in the small and heated tank 6, the heating being regulated by the Refuel Controller 12, according to the temperature of the diesel oil-biodiesel mixture leaving the main tank 5, detected by the fourth temperature sensor 26.

The mixing valve 8 or, preferably, the diverter valve 8a, by means of which the transition from light oil diesel to biodiesel in the start-up phase and from biodiesel to light oil diesel in the shutdown phase will take place, guarantees the absence or residual trace of biodiesel in the fuel system. This avoids having stagnant biodiesel in the engine injection system (causing damage after a prolonged period of "machine downtime") and ensures faster engine ignition 2, when required.

Optionally, the engine 2 is supplied with biodiesel, during a regeneration of the FAP 3.

The regeneration of the FAP 3, if present, takes place as follows. First of all, the Refuel Controller 12 receives information from all sensors placed on the exhaust line, in particular:
- the temperature difference between inlet and outlet from the FAP 3, from the first and from the second temperature sensor 20 and 21;
- the pressure difference between inlet and outlet from the FAP 3, from the differential pressure sensor 22;
- the oxygen concentration upstream of the additional injector 10 and downstream of the oxidizing catalyst 3a, respectively from the first and second lamba probes 23, 24.

The Refuel Controller 12 records the constriction of the FAP 3 and orders and manages the regeneration of the same which takes place according to the following steps:
- preparation for injection: closing of the EGR valve 11a, if present, and small injections of fuel, through the supplementary injector 10, for a first temperature increase of the FAP 3 up to a temperature of 350 a 450° C.;
- fuel injections: through the additional injector 10, into the exhaust duct 11, in order to increase the temperature of the FAP 3 up to the regeneration temperature (550 a 650° C.), detected by the first and second temperature sensor 20, 21, the quantity of fuel injected being controlled by means of the lamba probes 23 and 24;
- end of injection: when the differential pressure sensor 20 detects that the FAP 3 is no longer clogged, it gradually stops injecting.

What is claimed is:

1. A method for using biodiesel fuel in compression ignition internal combustion engines (2), the biodiesel fuel being present in a light oil diesel biodiesel blend with a percentage of biodiesel greater than 7%, in which the percentage of biodiesel higher than 7% causes an increase in a viscosity of the mixture, the increase in viscosity negatively affecting the cold start of the engine (2), the method comprises reducing the biodiesel concentration in the starting phase of the engine (2), the concentration reduction being obtained by adding light oil diesel to the light oil diesel-biodiesel blend using a mixing valve (8) or by using only light oil diesel using a diverter valve (8a);
   - wherein the blend, made up of light oil diesel and biodiesel with a percentage of biodiesel in an amount up to 100%, is contained in a main tank (5);
   - wherein the light oil diesel is contained in an auxiliary tank (7);
   - wherein the blend is sent to a small and heated tank (6) by means of a first low pressure pump (5a); and
   - wherein a second and third low pressure pump (6a, 7a) pump, respectively, the blend of light oil diesel-biodiesel from the heated tank (6) and the light oil diesel from the auxiliary tank (7) towards the mixing valve (8) or the diverter valve (8a), thus preparing the blend that will feed the diesel engine (2) through a high pressure pump (9).

2. The method for using biodiesel fuel in internal combustion engines (2) according to claim 1, the method further comprises the reduction of the biodiesel concentration also in the shutdown phase of the engine (2), in order to avoid that in the feeding ducts of the engine (2) the diesel oil biodiesel blend remains with a biodiesel concentration higher than 7%.

3. The method for using biodiesel fuel in internal combustion engines (2) according to claim 1, wherein the start-up and/or shutdown steps are carried out with only light oil diesel.

4. The method for using biodiesel fuel in internal combustion engines (2) according to at least one of claim 1, wherein the engine (2) is fed with a light oil-biodiesel diesel mixture, with a percentage of biodiesel not exceeding 7%, during the regeneration of the antiparticulate filter (FAP 3).

5. The method for using biodiesel fuel in internal combustion engines (2) according to claim 1, wherein the engine (2) is supplied with biodiesel, during a regeneration of a antiparticulate filter (FAP 3).

6. The method for using biodiesel fuel in internal combustion engines (2) according to claim 1, wherein, if the engine (2) is to operate in particularly harsh environmental conditions from the point of view of temperatures, the diesel oil-biodiesel blend is heated before its use, since the viscosity of the blend increases as the temperature decreases, even solidifying.

7. The method for using biodiesel fuel in internal combustion engines (2) according to claim 6, wherein the heating, detected by a first temperature sensor (25), takes place in the small and heated tank (6).

8. The method for using biodiesel fuel in internal combustion engines (2) according to claim 6, wherein the heating is regulated by a Refuel Controller (12), according to the temperature of the diesel oil-biodiesel blend leaving the main tank (5), detected by a fourth temperature sensor (26).

9. A device (4) for the use of diesel-light oil biodiesel blends, with biodiesel percentages higher than 7%, in compression-ignition internal combustion engines (2), of the type including an ECU (Engine Control Unit) (13) adapted to control the operation of the motor (2), the device (4) comprises:
   - an auxiliary tank (7) for containing light oil diesel;
   - a mixing valve (8) adapted to mix the diesel oil biodiesel blend with the light oil diesel coming from the auxiliary tank (7) or a diverter valve (8a), so that the motor (2) and the injector (10) are sent the only light oil diesel;
a Refuel Controller (12);
wherein the Refuel Controller (12) is connected with the ECU (13) and the mixing valve (8);
wherein the Refuel Controller (12) receives information on the operation of the engine (2) from the ECU (13) and sends signals for the control of the mixing valve (8), so as to regulate the percentage of biodiesel in the diesel oil-biodiesel mixture;
wherein it is provided a small and heated tank (6) configured to receive the blend by means of a first low pressure pump (5a).

10. The device (4) according to claim 9, wherein the internal combustion engine (2) with spontaneous ignition is provided with an antiparticulate filter (FAP) (3) and an oxidizing catalyst (3a), of the type comprising:
an additional injector (10) adapted to inject fuel, so that the fuel burns with the exhaust gases, to increase the temperature of the antiparticulate filter (FAP) (3) up to a regeneration temperature of the FAP (3);
a first temperature sensor (20) designed to detect the temperature of the exhaust gases at an inlet of the FAP (3);
a second temperature sensor (21) designed to detect the temperature of the exhaust gases at an output of the FAP (3);
a differential pressure sensor (22) able to detect the difference in pressure between inlet and outlet of the FAP (3);
a first lambda probe (23), designed to detect the percentage of oxygen in the exhaust gases, positioned in the exhaust duct (11), upstream of the additional injector (10);
a second lambda probe (24), suitable for detecting the percentage of oxygen in the exhaust gases, positioned in the exhaust duct (11), downstream of the oxidizing catalyst (3a);
a flow regulator (10a);
such Refuel Controller (12) receiving information on the operation of the FAP (3) and sending signals to:
the flow regulator (10a) in order to adjust the fuel flow to the additional injector (10);
the additional injector (10) in order to adjust its opening.

11. The device (4) according to claim 9, wherein it is present only the diverter valve (8a), so that the motor (2) and the injector (10) are sent the only light oil diesel, completely excluding biodiesel in the steps of engine (2) start-up and regeneration of the FAP (3).

12. The device (4) according to at least one of claim 9, wherein it further comprises:
the small and heated tank (6), equipped with a third temperature sensor (25), designed to heat the diesel-oil-biodiesel blend in the event that the temperature of the blend is too low for use;
a fourth temperature sensor (26), suitable for detecting the temperature of the diesel oil biodiesel blend contained in a main tank (5);
the third and fourth temperature sensors (25, 26) being connected to the Refuel Controller (12), in which the Refuel Controller (12) is adapted to control the heating of the heated tank (6) as a function of the temperature of the blend present in the main tank (5).

13. The device (4) according to claim 9, wherein, if the engine (2) is to operate in particularly harsh environmental conditions from the point of view of temperatures, the diesel oil-biodiesel blend is heated before its use, since the viscosity of the blend increases as the temperature decreases, even solidifying.

14. The device (4) according to claim 13, wherein the heating, detected by a first temperature sensor (25), takes place in the small and heated tank (6).

15. The device (4) according to claim 13, wherein the heating is regulated by the Refuel Controller (12), according to the temperature of the diesel oil-biodiesel blend leaving a main tank (5), detected by a fourth temperature sensor (26).

* * * * *